(12) United States Patent
Erdmann

(10) Patent No.: US 8,272,398 B2
(45) Date of Patent: Sep. 25, 2012

(54) LIQUID DISCRIMINATING VENT VALVE

(75) Inventor: Matthew Lorenz Erdmann, Ypsilanti, MI (US)

(73) Assignee: Eaton Corporation, Cleveland, OH (US)

( * ) Notice: Subject to any disclaimer, the term of this patent is extended or adjusted under 35 U.S.C. 154(b) by 648 days.

(21) Appl. No.: 12/406,231

(22) Filed: Mar. 18, 2009

(65) Prior Publication Data

US 2010/0236640 A1    Sep. 23, 2010

(51) Int. Cl.
*F16K 21/04* (2006.01)

(52) U.S. Cl. ......... 137/533; 137/197; 137/198; 137/588

(58) Field of Classification Search .......... 137/197–200, 137/532, 533; 251/338
See application file for complete search history.

(56) References Cited

U.S. PATENT DOCUMENTS

| | | | | |
|---|---|---|---|---|
| 1,619,386 | A | * | 3/1927 | Warring et al. ............... 137/198 |
| 1,708,622 | A | * | 4/1929 | Hoffman ........................ 137/198 |
| 2,707,804 | A | * | 5/1955 | Thornburg .................... 137/200 |
| 2,713,871 | A | * | 7/1955 | Kroder .......................... 137/197 |
| 2,734,521 | A | * | 2/1956 | Hencken ....................... 137/197 |
| 2,823,693 | A | * | 2/1958 | Balter ........................... 137/197 |
| 4,381,929 | A | * | 5/1983 | Mizuno et al. ................ 123/519 |
| 4,813,446 | A | * | 3/1989 | Silverwater et al. .......... 137/198 |
| 5,354,133 | A | * | 10/1994 | Rapparini ...................... 137/533 |
| 5,439,023 | A | * | 8/1995 | Horikawa ...................... 137/202 |
| 6,758,235 | B2 | * | 7/2004 | Frohwein et al. ............. 137/202 |
| 6,895,943 | B1 | | 5/2005 | Taxon |
| 2002/0157706 | A1 | | 10/2002 | Bergsma |
| 2002/0160245 | A1 | * | 10/2002 | Genc .............................. 137/198 |
| 2002/0195141 | A1 | * | 12/2002 | Ruschke ........................ 137/199 |
| 2006/0096258 | A1 | | 5/2006 | Gouzou et al. |
| 2007/0175514 | A1 | | 8/2007 | Tharp et al. |

FOREIGN PATENT DOCUMENTS

FR    2774951 A1    8/1999

* cited by examiner

*Primary Examiner* — Craig Schneider
*Assistant Examiner* — Craig J Price
(74) *Attorney, Agent, or Firm* — Quinn Law Group, PLLC

(57) ABSTRACT

A valve assembly for a fuel tank includes a housing. A membrane supported by the housing such that the membrane covers a vapor passage defined by the housing. The membrane allows the passage of vapor through the membrane and prevents the passage of liquid through the membrane. A flow control feature is supported by the housing to assist in controlling flow of a vapor through the membrane and the vapor passage. The flow control feature assists in controlling flow by one of shielding liquid from the membrane and providing variable flow through the vapor passage.

14 Claims, 2 Drawing Sheets

LIQUID DISCRIMINATING VENT VALVE

TECHNICAL FIELD

The invention relates to a valve assembly with a vent flow bypass for a tank such as a fuel tank.

BACKGROUND OF THE INVENTION

Fuel tank valve assemblies that control the fluid level within the tank and provide nozzle shutoff are known. The fuel tanks must include vapor venting ability for gasses within the tank to maintain balanced pressure as the fuel levels within the tank change. Additionally, these valve assemblies often provide protection from liquid escaping during roll over conditions. However it is also desirable to prevent liquid from escaping due to sloshing of the liquid under normal conditions.

SUMMARY OF THE INVENTION

A valve assembly for a tank is provided. The valve assembly includes a housing. A portion of the housing is located at least partially outside of the tank. The housing also defines a vapor passage. A membrane is supported by the housing such that the membrane covers the vapor passage. The membrane allows the passage of vapor through the membrane and prevents the passage of liquid through the membrane. A flow control feature is supported by the housing to assist in controlling flow of a vapor through the membrane and the vapor passage. The flow control feature assists in controlling flow by providing variable flow through the vapor passage. A splash guard is useful in reducing the amount of liquid that comes in contact with the membrane.

The housing includes a vapor recovery housing portion located at least partially outside of the tank and a tank housing portion located at least partially within the tank.

Additionally, a carrier may be secured to the housing. The membrane is attached to the carrier such that the membrane covers the vapor passage and a carrier opening is defined by the carrier to allow the passage of vapor and prevent the passage of liquid.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
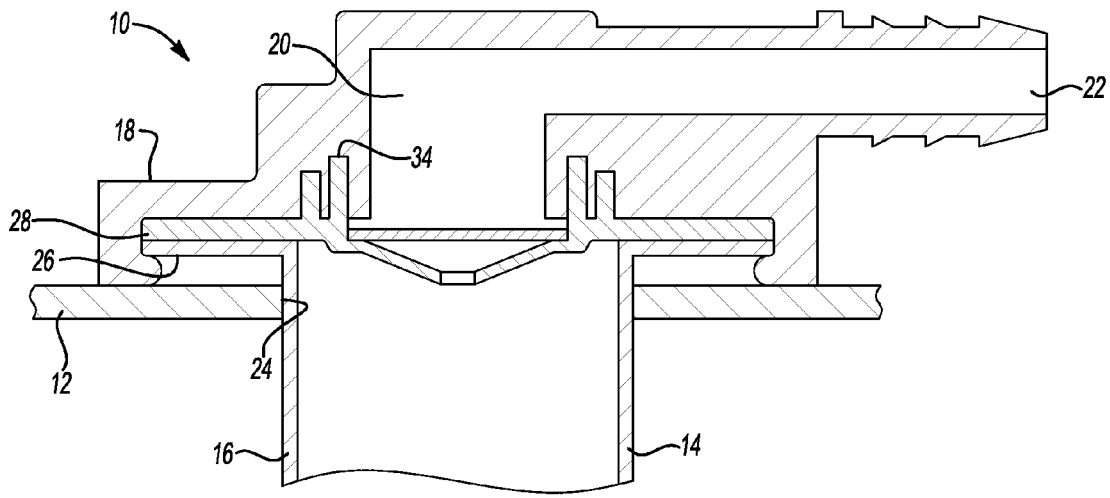
FIG. 1 is a schematic fragmentary cross-sectional illustration of a valve assembly mounted to a fuel tank.

Referring to the drawings, wherein like reference numbers refer to like components, FIG. 1 shows a valve assembly 10 mounted to a fuel tank 12. The valve assembly 10 has a housing 14. A first housing portion 16 is located primarily within the fuel tank 12. A second housing portion 18 is located primarily outside of the fuel tank 12. The housing 14 also defines a vapor passage 20, also referred to as a vent opening, which is in fluid communication with a vapor outlet 22. The vapor outlet 22 leads to a vapor recovery canister (not shown) or other destination outside of the tank 12.

The first housing portion 16 is inserted within a tank hole 24 in the fuel tank 12. The first housing portion 16 could also be mounted externally with a passageway that allows communication with the interior of the tank. The first housing portion 16 includes a flange 26 which is located outside of the fuel tank 12 to prevent the valve assembly 10 from passing entirely through the tank hole 24 and into the fuel tank 12. The second housing portion 18 is sometimes referred to as the vapor recovery side of the housing 14. The second housing portion 18 is secured to the first housing portion 16 at the flange 26. A carrier 28 is located between the first housing portion 16 and the second housing portion 18. Securing the second housing portion 18 on the first housing portion 16 retains the carrier 28 to the housing 14.

Figure 2:
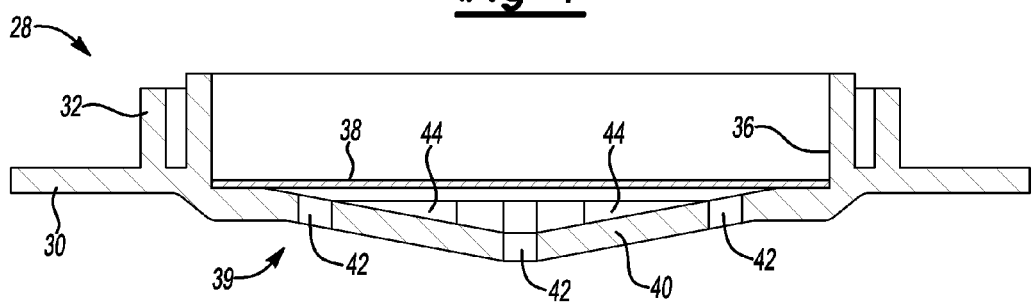
FIG. 2 is a schematic cross-sectional illustration of a membrane carrier for the valve assembly of FIG. 1.
Figure 3:
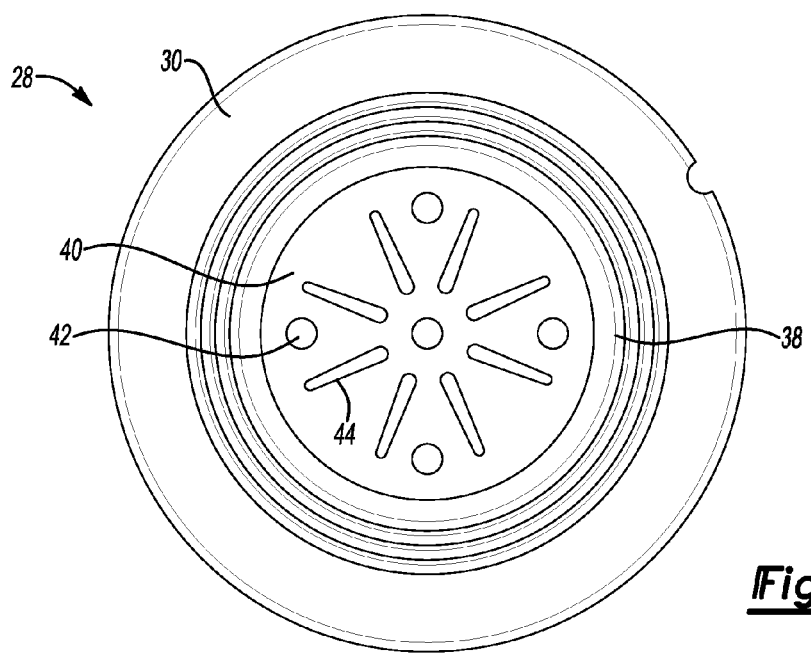
FIG. 3 is a schematic end view illustration of the membrane carrier for the valve assembly of FIGS. 1 and 2.

FIG. 2 illustrates an enlarged cross-sectional view of the carrier 28 and FIG. 3 illustrates a bottom view of the carrier 28 of FIG. 1. The carrier 28 is generally annular in shape having a main body 30. At least one finger 32 protrudes upwardly from the main body 30. The finger 32 corresponds to indentations 34 (shown in FIG. 1) on the second housing portion 18 when the carrier 28 is assembled with the housing 14. As discussed above, and illustrated in FIG. 1, the main body 30 is secured between the first housing portion 16 and the second housing portion 18 when the valve assembly 10 is assembled. The annular shape of the carrier 28 defines a carrier opening 36 through which vapor within the fuel tank 12 can vent through to the vapor vent passage 20 (shown in FIG. 1). A membrane 38 is secured to the carrier 28 and extends over the entire carrier opening 36. The membrane 38 is of a material that allows vapor to pass through the membrane 38 but prohibits liquid from passing through. The membrane may be secured to the carrier 28 by weld, adhesive, heat sealing, insert molding, or other methods. One skilled in the art would know the appropriate attachment required for a particular carrier 28 and membrane 38 arrangement.

The carrier 28 includes at least one flow control feature 39. In the embodiment shown the flow control feature 39 is a deflector 40. As the membrane 38 is exposed to liquid, the liquid may slow the flow rate of the vapor through the membrane. Thus, the deflector 40 deters liquid from reaching the membrane 38 to help maintain the vapor flow rate through the membrane 38 at a predetermined level.

The deflector 40 extends downwardly and inwardly from the main body 30 of the carrier 28. The deflector 40 defines at least one deflector opening 42 and may define a plurality of deflector openings. The deflector 40 would assist in directing liquid away from the membrane 38 and the vapor vent passage 20 while the deflector opening 42 allows vapor to pass the deflector 40 and exit the fuel tank 12 through the membrane 38. The size and number of deflector openings 42 may be set to control the maximum amount of vapor that may pass through at one time. Additionally, the deflector 40 may include several layers of material with deflector openings 42 at various locations on each layer of the deflector 40. This would create a tortuous flow path further assisting in deflecting liquid away from the membrane 38.

The carrier 28 may also include a plurality of ribs 44 extending upwardly from the deflector 40. The ribs 44 are arranged radially on the deflector 40 and provide support for the membrane 38 and assist in stiffening the deflector 40. Additionally, the flow control feature 39 may include optimizing the size of the carrier opening 36 to control the maximum flow rate of the vapor that may exit the fuel tank 12 at one time.

Figure 4:
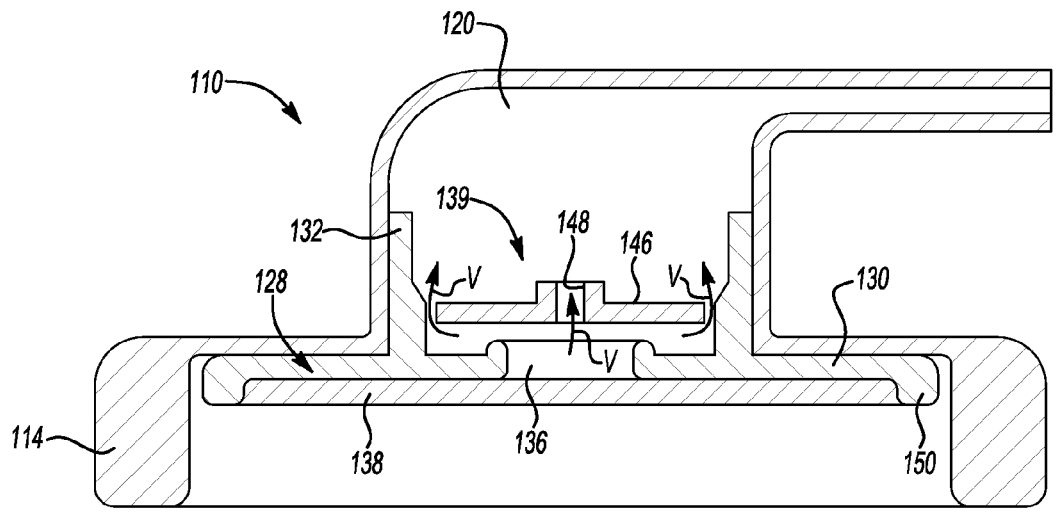
FIG. 4 is a schematic cross-sectional illustration of another embodiment of a valve assembly.

FIG. 4 illustrates a second embodiment of a valve assembly 110 having a carrier 128 for use with a fuel tank 12 (shown in FIG. 1). The carrier 128 is mounted to a housing 114. The carrier 128 includes a main body 130. At least one finger 132 protrudes upwardly from the carrier 128 to assist in securing the carrier 128 to the housing 114. The main body 130 defines a carrier opening 136. A membrane 138 is secured to the main body 130 to cover at least the carrier opening 136. The membrane 138 may be larger in size than the carrier opening 136. The size of the carrier opening 136 may be determined based upon the maximum desired vapor flow through the housing 114 to a vapor vent passage 120.

The membrane 138 is illustrated in as a generally flat membrane. However, the membrane 138 may also be a cylinder or may be pleated to increase the surface area of the membrane 138. One skilled in the art would know the proper shape for a membrane 138 for a particular valve assembly 110 arrangement.

A flow control feature 139 for the valve assembly 110 is a head valve. The flow control feature 139 includes a disc (or plate) 146. The disc 146 is located above the carrier 128 within the vapor vent passage 120. The disc 146 defines a disc opening 148 through which vapor may exit the fuel tank 12 (shown in FIG. 1). The disc opening 148 is smaller in diameter than the carrier opening 136 and is sized to control the amount of flow at a given pressure inside the tank. When the vapor pressure within the fuel tank 12 reaches a sufficient level the disc 146 is lifted off the carrier 138, as shown. The vapor may exit through the disc opening 148 and around the sides of the disc 146, as illustrated by arrows V. The finger 132 assists in guiding the disc 146 in the proper position with respect to the carrier 128. As the vapor escapes the fuel tank 12 the pressure within the fuel tank 12 decreases and the disc 146 returns to the resting position on the carrier 128. Vapor may still exit the fuel tank through the disc opening 148 but will not exit around the disc 146 until the pressure again increases to a level that will raise the disc 146 off the carrier 128.

The carrier 128 may also include flange protrusions 150 extending downward from the main body 130. The flange protrusions 150 assist in attaching the membrane 138 to the carrier 128. The membrane 138 may be attached by weld, adhesive, heat sealing, insert molding, or other methods. One skilled in the art would know the appropriate attachment required for a particular carrier 128 and membrane 138 arrangement.

Figure 5:
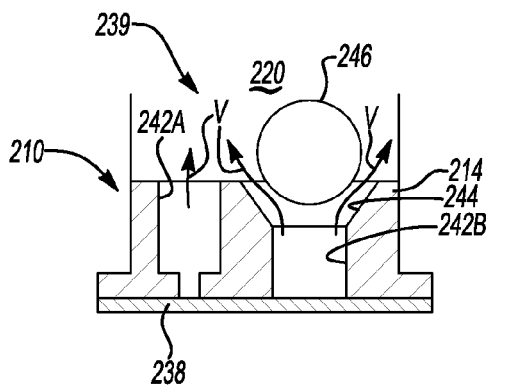
FIG. 5 is a schematic cross-sectional illustration of third embodiment of a valve assembly.

FIG. 5 illustrates another embodiment of a valve assembly 210. The valve assembly 210 has a housing 214. The valve assembly 210 has a housing 214 with features that define at least one passageway 242A and 242B for vapor flow. The housing 214 interfaces with the fuel tank (not shown).

A membrane 238 is secured to the housing 214 to cover at least the first housing opening 242A and the second housing opening 242B. The size of the first housing opening 242A and of the second housing opening 242B may be determined based upon the maximum desired vapor flow through the housing 214 to a vapor passage 220 also defined by the housing. The membrane 238 is illustrated in as a generally flat membrane. However, the membrane 238 may also be a cylinder or may be pleated to increase the surface area of the membrane 238. One skilled in the art would know the proper shape for a membrane 238 for a particular valve assembly 210 arrangement.

A flow control feature 239 for the valve assembly 210 is a head valve which includes a ball 246 located within the second housing opening 242B. The ball 246 is located above the housing 214 partially within the vapor vent passage 220 and the second housing opening 242B. The second housing opening 242B may have an enlarged or tapered portion 244 for guiding and supporting the ball 246. Vapor may exit the fuel tank 212 through the first housing opening 242A which includes an orifice limiting the flow. When the vapor pressure within the fuel tank reaches a sufficient level the ball 246 is lifted off the housing 214, as shown. The vapor may exit through the first housing opening 242A and the second housing opening 242B around the sides of the ball 246, as illustrated by arrows V. The tapered portion 244 assists in guiding the ball 246 in the proper position with respect to the housing 214. As the vapor escapes the fuel tank the pressure within the fuel tank decreases and the ball 246 returns to the resting position on the housing 214. Vapor may still exit the fuel tank through the first housing opening 242A but will not exit through the second housing opening 242B until the pressure within the fuel tank again increases to a level that will raise the ball 246 off the housing 214.

Figure 6:
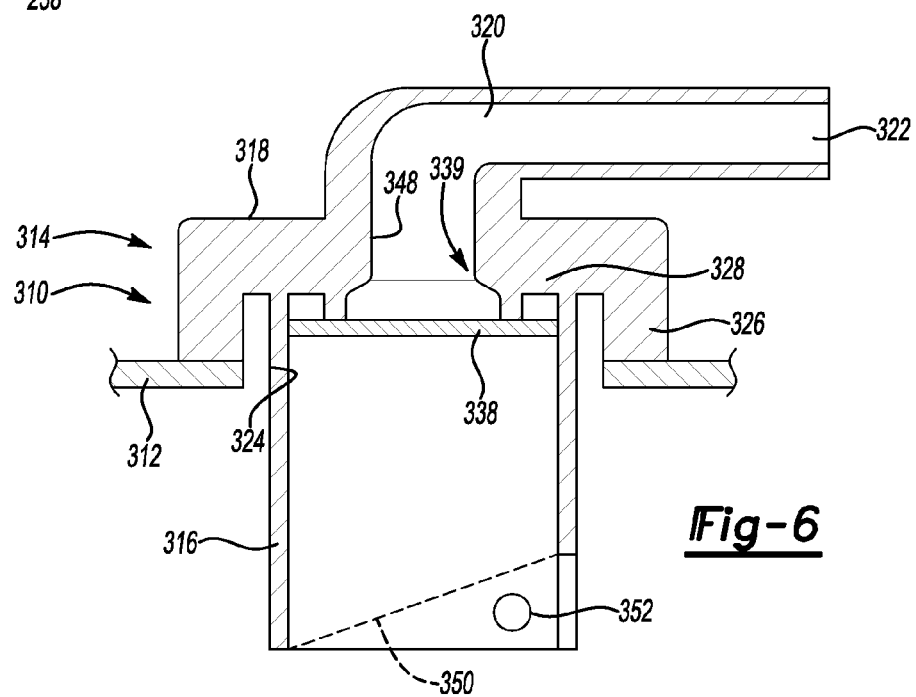
FIG. 6 is a schematic cross-sectional illustration of a fourth embodiment of a valve assembly.

FIG. 6 illustrates another embodiment of a valve assembly 310. The valve assembly 310 has a housing 314. A first housing portion 316 is located primarily within the fuel tank 312 and a second housing portion 318 is located primarily outside of the fuel tank 312. The housing 314 also defines a vapor vent passage 320, also referred to as a vent opening, which is in fluid communication with a vapor outlet 322. The vapor outlet 322 leads to a vapor recovery canister (not shown) or other destination outside of the tank 312.

The first housing portion 316 is inserted within a tank hole 324 in the fuel tank 312. The housing 314 includes a flange 326 which is located outside of the fuel tank 312 to prevent the valve assembly 310 from passing entirely through the tank hole 324 and into the fuel tank 312. The second housing portion 318 is sometimes referred to as the vapor recovery side of the housing 314.

The housing 314 includes a carrier 328. A membrane 338 is secured to the carrier 328 by weld, adhesive, heat sealing, insert molding, or other methods. One skilled in the art would know the appropriate attachment required for a particular membrane 338.

The membrane 138 is illustrated in as a generally flat membrane. However, the membrane 138 may also be a cylinder, may be spirally wound, or may be pleated to increase the surface area of the membrane 138. One skilled in the art would know the proper shape for a membrane 138 for a particular valve assembly 110 arrangement.

The carrier 328 and housing 314 defines a housing opening 348 through which vapor within the fuel tank 312 can vent through to the vapor vent passage 320. The membrane 338 is secured to the carrier 328 and extends over the entire housing opening 348. The membrane 338 is of a material that allows vapor to pass through the membrane 338 but prohibits liquid from passing through.

The carrier 328 includes at least one flow control feature 339. In the embodiment shown, the flow control feature 339 is a restriction in the size of the housing opening 348 to control the amount of vapor that may exit the fuel tank 312 at one time.

Additionally the flow control feature 339 may include a soft shut off feature on the first housing portion 316. The first housing portion 316, in this instance, is often referred to as a dip tube. The first housing portion 316 extends downward within the fuel tank 312. As is known to those skilled in the art the first housing portion 316 may provide an air pocket to control shut off of a fuel pump when filling the fuel tank. In the embodiment shown, the first housing portion 316 has a tapered edge 350 around at least a portion of the first housing portion 316. Additionally, the first housing portion 316 defines a fuel shut off aperture 352. The tapered edge 350 and the fuel shut off aperture 352 provide for restricted vapor flow as the fuel tank 312 is filled with fluid. Therefore, this will accommodate for sloshing as the fuel tank is filled, by minimizing the amount of liquid from the sloshing that reaches the membrane 338. The tapered edge 350 and fuel shut off aperture 352 can be used together or individually to restrict vapor flow into the housing as the liquid level rises until the tapered edge 350 and the fuel shut off aperture 352 are completely submerged.

Alternatively to a dip tube, the flow control feature 339 may include a float located within the first housing portion 316 which may also be used to control fuel shut off at a fuel pump, as is known in the art.

While the best modes for carrying out the invention have been described in detail, those familiar with the art to which this invention relates will recognize various alternative designs and embodiments for practicing the invention within the scope of the appended claims.

The invention claimed is:

1. A valve assembly for a tank comprising:
   a housing having a housing portion located at least partially outside of the tank, wherein the housing defines a vapor passage;
   a carrier secured to the housing, wherein the carrier defines a carrier opening;
   a membrane attached to the carrier such that the carrier opening is between the membrane and the vapor passage and the membrane covers the vapor passage and the carrier opening to allow the passage of vapor through the membrane to the carrier opening and the vapor passage and prevent the passage of liquid through the membrane;
   a flow control feature supported by the carrier such that the flow control feature is between the carrier opening and the vapor passage; wherein the flow control feature is configured to provide a variable flow rate of vapor that has passed through the membrane; wherein the flow control feature is a head valve;
   wherein the head valve further comprises a disc located in the vapor passage of the housing on a vapor recovery side of the carrier; and wherein the disc further defines a disc opening configured to provide continuous fluid communication between the carrier opening and the vapor passage.

2. The valve assembly of claim 1, wherein the disc rests on the carrier and is sized to allow venting around the disc, between the disc and the carrier.

3. The valve assembly of claim 1, wherein the carrier includes at least one finger extending toward the vapor passage and configured to guide the disc.

4. The valve assembly of claim 3, wherein the carrier includes flange protrusions extending away from the vapor passage opposite said at least one finger and configured to support the membrane.

5. The valve assembly of claim 1, wherein the disc is configured to allow vapor flow from the carrier opening around the disc when pressure of the vapor that has passed through the membrane reaches a predetermined level.

6. The valve assembly of claim 1, wherein the housing is configured such that the vapor passage extends to an outlet substantially perpendicular to the carrier opening.

7. A valve assembly for a tank comprising:
   a housing having a housing portion located at least partially outside of the tank, wherein the housing defines a vapor passage;
   a carrier secured to the housing, wherein the carrier defines a carrier opening;
   a membrane attached to the carrier such that the carrier opening is between the membrane and the vapor passage and the membrane covers the vapor passage and the carrier opening to allow the passage of vapor through the membrane to the carrier opening and the vapor passage and prevent the passage of liquid through the membrane;
   a flow control feature supported by the carrier such that the flow control feature is between the carrier opening and the vapor passage; wherein the flow control feature is configured to provide a variable flow rate of vapor that has passed through the membrane; wherein the flow control feature is a head valve;
   wherein the head valve further comprises a disc located in the vapor passage of the housing on a vapor recovery side of the carrier; wherein the disc further defines a disc opening configured to provide continuous fluid communication between the carrier opening and the vapor passage;
   wherein the disc rests on the carrier and is sized to allow venting around the disc, between the disc and the carrier; and
   wherein the carrier includes at least one finger extending toward the vapor passage and configured to guide the disc.

8. The valve assembly of claim 7, wherein the carrier includes flange protrusions extending away from the vapor passage opposite said at least one finger and configured to support the membrane.

9. The valve assembly of claim 7, wherein the disc is configured to allow vapor flow from the carrier opening around the disc when pressure of the vapor that has passed through the membrane reaches a predetermined level.

10. The valve assembly of claim 7, wherein the housing is configured such that the vapor passage extends to an outlet substantially perpendicular to the carrier opening.

11. A valve assembly for a tank comprising:
    a housing having a housing portion located at least partially outside of the tank, wherein the housing defines a vapor passage;
    a carrier secured to the housing, wherein the carrier defines a carrier opening;
    a membrane attached to the carrier such that the carrier opening is between the membrane and the vapor passage and the membrane covers the vapor passage and the carrier opening to allow the passage of vapor through the membrane to the carrier opening and the vapor passage and prevent the passage of liquid through the membrane;

a flow control feature supported by the carrier such that the flow control feature is between the carrier opening and the vapor passage; wherein the flow control feature is configured to provide a variable flow rate of vapor that has passed through the membrane; wherein the flow control feature is a head valve;

wherein the head valve further comprises a disc located in the vapor passage of the housing on a vapor recovery side of the carrier; wherein the disc further defines a disc opening configured to provide continuous fluid communication between the carrier opening and the vapor passage;

wherein the disc rests on the carrier and is sized to allow venting around the disc, between the disc and the carrier; and wherein the disc is configured to allow vapor flow from the carrier opening around the disc when pressure of the vapor that has passed through the membrane reaches a predetermined level.

12. The valve assembly of claim 11, wherein the carrier includes at least one finger extending toward the vapor passage and configured to guide the disc.

13. The valve assembly of claim 12, wherein the carrier includes flange protrusions extending away from the vapor passage opposite said at least one finger and configured to support the membrane.

14. The valve assembly of claim 11, wherein the housing is configured such that the vapor passage extends to an outlet substantially perpendicular to the carrier opening.

* * * * *